United States Patent
Hu et al.

(10) Patent No.: US 10,103,373 B2
(45) Date of Patent: Oct. 16, 2018

(54) DIAPHRAGM PAPER, AND PREPARATION METHOD AND APPLICATION THEREOF

(71) Applicant: SOUTH CHINA UNIVERSITY OF TECHNOLOGY, Guangzhou, Guangdong (CN)

(72) Inventors: Jian Hu, Guangzhou (CN); Jin Long, Guangzhou (CN); Xiwen Wang, Guangzhou (CN)

(73) Assignee: South China University of Technology, Guangzhou (CN)

( * ) Notice: Subject to any disclaimer, the term of this patent is extended or adjusted under 35 U.S.C. 154(b) by 355 days.

(21) Appl. No.: 14/762,716

(22) PCT Filed: Jan. 23, 2013

(86) PCT No.: PCT/CN2013/070904
§ 371 (c)(1),
(2) Date: Nov. 3, 2015

(87) PCT Pub. No.: WO2014/113944
PCT Pub. Date: Jul. 31, 2014

(65) Prior Publication Data
US 2016/0049627 A1    Feb. 18, 2016

(51) Int. Cl.
| H01M 2/16 | (2006.01) |
| H01M 2/14 | (2006.01) |
| D21H 21/16 | (2006.01) |
| D21H 25/02 | (2006.01) |
| D21H 25/14 | (2006.01) |
| D21H 27/38 | (2006.01) |

(52) U.S. Cl.
CPC .......... *H01M 2/1686* (2013.01); *D21H 21/16* (2013.01); *D21H 25/02* (2013.01); *D21H 25/14* (2013.01); *D21H 27/38* (2013.01); *H01M 2/145* (2013.01); *H01M 2/162* (2013.01); *H01M 2/1626* (2013.01)

(58) Field of Classification Search
None
See application file for complete search history.

(56) References Cited

U.S. PATENT DOCUMENTS

| 5,401,594 A * | 3/1995 | Schwobel | H01M 2/162 |
| | | | 429/142 |
| 6,291,105 B1 * | 9/2001 | Yamamoto | H01M 2/162 |
| | | | 429/249 |
| 2003/0096171 A1 * | 5/2003 | Thrasher | H01M 2/162 |
| | | | 429/247 |
| 2004/0048152 A1 * | 3/2004 | Yata | H01M 2/0207 |
| | | | 429/162 |
| 2009/0017385 A1 * | 1/2009 | Harada | H01M 2/1613 |
| | | | 429/255 |
| 2010/0092853 A1 * | 4/2010 | Ito | H01M 2/162 |
| | | | 429/129 |
| 2010/0316912 A1 * | 12/2010 | Hashimoto | H01G 9/02 |
| | | | 429/254 |
| 2011/0143183 A1 * | 6/2011 | Matsumoto | H01M 2/1626 |
| | | | 429/144 |
| 2011/0229750 A1 * | 9/2011 | McLellan | H01M 2/162 |
| | | | 429/144 |
| 2011/0236744 A1 * | 9/2011 | Kim | H01M 2/162 |
| | | | 429/144 |
| 2012/0164514 A1 * | 6/2012 | Hayakawa | H01M 2/145 |
| | | | 429/144 |
| 2013/0022858 A1 * | 1/2013 | Mazur | H01M 2/1606 |
| | | | 429/145 |
| 2013/0183569 A1 * | 7/2013 | Hayakawa | H01M 2/1626 |
| | | | 429/144 |

FOREIGN PATENT DOCUMENTS

WO    WO 2012/036025    *    3/2012    ............ H01M 10/24

OTHER PUBLICATIONS

Canfor1 (PDF image of CSF to SR freeness [beating degree] converter located at: http://www.temap.com/calculators/index.html#) (Year: 2017).*

* cited by examiner

*Primary Examiner* — Jeremiah R Smith
(74) *Attorney, Agent, or Firm* — Lewis Roca Rothgerber Christie LLP

(57) ABSTRACT

Diaphragm paper, and a preparation method and an application thereof. The diaphragm paper comprises a first layer, a second layer, and a third layer, wherein the second layer is located between the first layer and the third layer; the first layer and the third layer are loose layers, of which the average aperture is larger than 10 μm and the basis weight is 5 to 30 g/m$^2$; and the second layer is a compact layer, of which the average aperture is smaller than 5 μm and the basis weight is 2 to 15 g/m$^2$. The compact layer has small aperture and good insulating performance, and is capable of effectively insulating a positive electrode and a negative electrode. The loose layers have good liquid permeability and electrolyte absorptivity, and can guarantee the discharge performance of a battery. The material is further advantageous in having good dimensional stability and being thin, so that a battery can achieve high capacity.

4 Claims, 1 Drawing Sheet

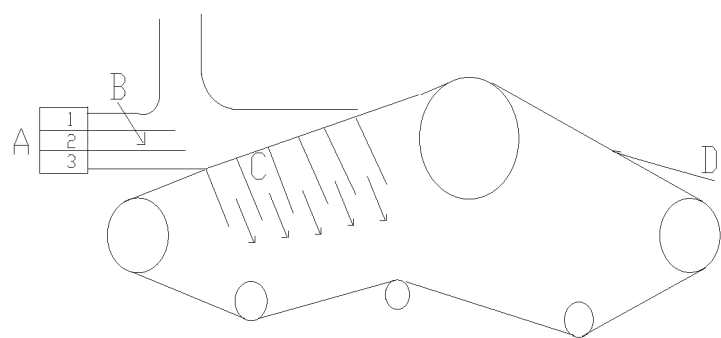

DIAPHRAGM PAPER, AND PREPARATION METHOD AND APPLICATION THEREOF

CROSS-REFERENDE TO RELATED APPLICATION(s)

This application is a National Phase Patent Application and claims priority to and the benefit of International Application Number PCT/CN2013/070904, filed on Jan. 23, 2013, the entire contents of which are incorporated herein by reference.

TECHNICAL FIELD

The present invention pertains to the field of new materials, specifically to a diaphragm paper, and preparation method and application thereof.

BACKGROUND TECHNOLOGIES

The diaphragm isolating the positive electrode active material and the negative electrode active material in alkaline zinc manganese battery, silver oxide battery, zinc-air battery, nickel-metal hydride battery and lithium ion battery needs to have a wide variety of properties, such as:

(1) preventing internal short circuit caused by the contact between the positive electrode active substance and the negative electrode active substance, but allowing ions can smoothly pass.

(2) having evenly distributed fibers to ensure the uniform and stable discharge performance of batteries.

(3) having appropriate tensile strength and alkaline absorption speed to meet the requirements of pipe manufacture process and continuous production line production process.

(4) having such alkaline absorption rate that it can meet the demand of ionic conductivity at the continuous discharge time, in particular having a large alkaline absorption rate at high-power discharge time.

(5) having excellent electrolyte resistance, especially under hot alkaline conditions, having stable dimension in the electrolyte, and preventing deformation or short circuit to ensure the stability of capacitance during the shelf life.

The phenomenon of "dendritic crystal" is widespread in alkaline manganese battery, however, the "dendritic crystal" easily penetrates the diaphragm with a large pore size, making the active materials of the two electrodes contact each other, thus generating internal short circuit and severely reducing the capacity of the battery. To prevent the internal short circuit caused by "dendritic crystal", it is required that the diaphragm should have smaller void structure, more specifically, the average pore size of the diaphragm should be less than 10 µm. Meanwhile, because the zinc power in the negative material of alkaline zinc manganese battery has a minimum diameter of 20 µm, the number of diaphragm pore whose size is greater than 20 µm is preferably not exceed 1% of the total number of pores, thus the internal short circuit can be prevented better.

Battery diaphragm generally is prepared by blending a variety of fibers through dry non-woven fabrics process or wet non-woven fabrics process, mainly has two types of structures, i.e., single layer and double layer. For example, the PCT patent application owned by Kuraray CO., LTD. (PCT publication No. WO2006/090790) discloses a single layer diaphragm used for alkaline battery, which has 25 to 62 wt % of alkali-resistant synthetic fiber, 5 to 25 wt % of fibrillated solvent-spun cellulose fiber with a Canadian standard freeness (CSF) of 10 to 280 ml, and 33 to 50 wt % of mercerized pulp with a CSF no less than 550 ml. Although such diaphragm has good alkali resistance and good compactness, good compactness increases the resistance of the diaphragm, deteriorates the absorbency of electrolyte and slows the absorption rate, and decreases the discharge performance of a battery. The PCT patent application owned by Eveready Battery Company, Inc. (PCT publication No. WO2003/043103) discloses another single layer battery diaphragm, which has a basis weight of 20 to 30 g/m$^2$, a thickness less than 0.15 mm and an average pore size less than 14 µm, and consists of 25 to 95 wt % of fibrillated fibers and synthetic fibers with a beating degree of 30 to 65 Shopper Riegler (SR). Although having a small average pore size and good insulating performance, it also exists some shortcomings such as the poor absorbency and absorption rate of the electrolyte. In addition, a patent application for invention owned by NIPPON KODOSHI CORP (publication No. CN1177843A, with a priority of JP265147/96) discloses a diaphragm laminated by a certain liquid penetration layer and a certain compact layer. The compact layer consists of 20 to 80 wt % of the alkali-resistant cellulose fibers and synthetic fibers, wherein the beating degree of the cellulose fibers is 500~0 ml when represented by CSF; the liquid penetration layer consists of 20 to 80 wt % of alkali-resistant cellulose fibers and synthetic fibers with a beating degree of 700 ml when represented by CSF; the compact layer forms alone. But this technology is difficult to meet the function of both having excellent electrolyte absorption performance and preventing internal short circuit at the same time. To guarantee the excellent electrolyte absorption performance, the relatively larger amount of liquid penetration layer will be required, and the amount of compact layer will be reduced at the moment. Because the compact layer forms alone and has less basis weight, the defects of the diaphragm are inevitably more, and the number of big pores increase, while the liquid penetration layer can not compensate those big pores, making it difficult to achieve excellent isolation performance. If increasing the amount of compact layer, the amount of liquid penetration layer will be reduced, then the diaphragm will be difficult to achieve excellent electrolyte absorbency. Such laminating mode makes the poor interlayer bonding force between the liquid penetration layer and the compact layer of diaphragm, and the large shrinkage during use.

SUMMARY OF THE INVENTION

The objects of the present invention is to overcome the defects existing in the prior art, to provide a new diaphragm paper comprising a three-layer structure (an intermediate layer, a upper layer and a lower layer), the intermediate layer has small pore size and good isolation performance, can isolate effectively the positive electrode from the negative electrode; the upper layer and the lower layer have excellent liquid permeability and electrolyte absorptivity, can guarantee the discharge performance of a battery. Such materials also have stable dimension and thin thickness, thereby achieving high capacity of batteries.

To solve the above technical issues, the present invention adopts the following technical solutions:

A diaphragm paper, comprising a first layer, a second layer and a third layer, the second layer is located between the first layer and the third layer; wherein, the first layer and the third layer are loose layers, with an average pore size greater than 10 µm and a basis weight of 5 to 30 g/m$^2$, each independently contains one or more materials selected from the group consisting of polyvinyl alcohol fiber, formalized polyvinyl alcohol fiber, polypropylene fiber, polyethylene fiber, ethylene-vinyl alcohol copolymer fiber, composite fiber, natural plant fiber, viscose fiber, aramid fiber and poly(p-phenylene-2,6-benzoxazole) fiber; the second layer is a compact layer, with an average pore size lesser than 5 µm and a basis weight of 2 to 15 g/m², contains one or more materials selected from the group consisting of polyvinyl alcohol fiber, polypropylene fiber, polyethylene fiber, ethylene-vinyl alcohol copolymer fiber, composite fiber, natural plant fiber, viscose fiber, aramid fiber and poly(p-phenylene-2,6-benzoxazole) fiber having a fineness above 0.5 dtex, and fibrillated fiber.

Preferably, the diaphragm paper of the present invention has a basis weight of 20 to 60 g/m², a thickness of 15 to 200 µm, an average pore size of 2-10 µm, a liquid absorption rate greater than 300%, a liquid absorption height greater than 30 mm per 10 min, and an area shrinkage rate less than 3%.

Preferably, the first layer and the third layer each independently accounts for 20 wt % to 40 wt % of the total mass of the diaphragm paper, the second layer accounts for 20 wt % to 60 wt % of the total mass of the diaphragm paper.

In a preferred diaphragm paper of the present invention, the first layer and the third layer each independently contains 10 wt % to 60 wt % of natural plant fiber or viscose fiber, 40 wt % to 80 wt % of one or more fibers selected from the group consisting of polyvinyl alcohol fiber, formalized polyvinyl alcohol fiber, polypropylene fiber, polyethylene fiber and ethylene vinyl alcohol copolymer fiber respectively based on the first layer or the third layer; the second layer contains 20 wt % to 90 wt % of fibrillated fiber and 10 wt % to 80 wt % of polyvinyl alcohol fiber having a fineness above 0.5 dtex based on the second layer.

In a more preferred diaphragm paper of the present invention, the first layer and the third layer each independently contains 30 wt % to 50 wt % of natural plant fiber or viscose fiber, 40 wt % to 60 wt % of polyvinyl alcohol fiber or formalized polyvinyl alcohol fiber respectively based on the first layer or the third layer; the second layer contains 30 wt % to 60 wt % of fibrillated fiber and 30 wt % to 60 wt % of polyvinyl alcohol fiber having a fineness above 0.5 dtex based on the second layer.

In another preferred diaphragm paper of the present invention, the first layer and the third layer each independently contains 50 wt % to 80 wt % of one or more selected from the group consisting of polypropylene fiber, polyethylene fiber, poly(p-phenylene-2,6-benzoxazole) fiber and para-aramid fiber; and 20 wt % to 50 wt % of composite fiber respectively based on the first layer or the third layer; the second layer contains 20 wt % to 90 wt % of fibrillated aramid fiber or fibrillated poly(p-phenylene-2,6-benzoxazole) fiber, 10 wt % to 80 wt % of one or more selected from the group consisting of polypropylene alcohol fiber, polyethylene fiber and ethylene vinyl alcohol copolymer fiber having a fineness above 0.5 dtex based on the second layer.

Preferably, various raw materials of the diaphragm paper of the present invention are as follows:

The natural plant fiber is one or more selected from the group consisting of hardwood pulp, mercerization pulp, cotton linter pulp, hemp pulp and tencel fiber with a beating degree of 15 to 50° SR.

The viscose fiber has a fineness of 0.3 to 1.1 dtex and a length of 2 to 6 mm.

The fibrillated fiber is one or more selected from the group consisting of fibrillated tencel fiber, fibrillated aramid fiber and fibrillated poly(p-phenylene-2,6-benzoxazole) fiber.

More preferably, the fibrillated fiber has a beating degree of 40 to 90° SR and a fiber diameter of 50 nm to 500 nm.

The polyethylene ethanol fiber, the formalized polyvinyl alcohol fiber, the polypropylene fiber, the polyethylene fiber and the ethylene-vinyl alcohol copolymer fiber have a fineness of 0.1 dtex to 0.5 dtex and a length of 2 to 6 mm.

The composite fiber is polypropylene/polyethylene fiber, polypropylene/ethylene-vinyl alcohol copolymer fiber or polypropylene/polyester fiber with a skin-core structure, or sea-island type polypropylene/polyester, ethylene vinyl alcohol copolymer fiber. More preferably, the composite fiber is polypropylene/polyethylene fiber with a skin-core structure.

To enhance the physical strength of the diaphragm paper, the present invention also provides a preferred embodiment:

The first layer, the second layer and the third layer further each independently contains 5% to 20% of water-soluble polyvinyl alcohol fiber with a water soluble temperature of 50° C. to 90° C. or hot-melt polyethylene fiber with a glass-transition temperature of 100° C. to 120° C. respectively based on the first layer, the second layer or the third layer.

To increase the wettability of the diaphragm, the present invention also additionally provides a preferred embodiment:

The diaphragm further comprises 0.1% to 1% of a sizing layer based on the total mass of the diaphragm paper, the sizing layer locates outside of the first layer and the third layer and is made up of one surface treatment agent selected from the group consisting of polyethylene oxide (PEO), surfactants such as sodium dodecyl benzene sulfonate, wetting fluid etc.

Another object of the present invention is to provide a method for preparing the diaphragm paper, comprising the following steps:

a. preparing raw material fibers in accordance with the formulations of the first layer, the second layer and the third layer respectively, each independently mixing and beating, diluting with water to a stock consistency of 0.1 wt % to 0.005 wt % to obtain the pulp of the first layer, the second layer and the third layer;

b. pouring the pulp of the first layer, the second layer and the third layer each independently into the paper machine, laminating and then making papers in the same area in order that the pulp of the second layer is formed between the pulp of the first layer and the pulp of the third layer.

Preferably, the method further comprises rectifying to make the pulp appear a flow state of high intensity and micro-scale turbulence before making papers.

Preferably, the pulp of three layers is formed in the time interval from 0.1 to 0.6 seconds one after another.

The method further comprises a sizing treatment after step b.

The method further comprises a calendering treatment after the sizing treatment.

Still another object of the present invention is to provide a use of the diaphragm paper, i.e. the diaphragm paper is used for manufacturing a diaphragm isolating the positive electrode material and the negative electrode material in alkaline zinc manganese battery, silver oxide battery, zinc-air battery, nickel-metal hydride battery or lithium ion battery.

The present invention also provides a battery having the diaphragm paper as a diaphragm located between the positive electrode and the negative electrode. To enhance the physical strength of multi-layered paper, the present invention uses water-soluble polyvinyl alcohol fiber or hot-melt polyethylene fiber as a strengthening agent. The strengthening agent is preferably water-soluble polyvinyl alcohol fiber with a water soluble temperature of 50° C. to 90° C. or hot-melt polyethylene fiber with a glass-transition temperature of 100° C. to 120° C. The amount of the strengthening agent is 5% to 20% by weight based on each layer; if the amount of the strengthening agent is too small, a good adhesion effect cannot be achieved and the tensile strength of the diaphragm will be reduced; if the amount of the strengthening agent is too much, the diaphragm will occur significantly pore blockage effect during the drying process, thereby deteriorating the liquid absorption and permeability.

The sizing treatment of the present invention may be the conventional means in the art, such as dipping sizing, film transfer sizing or spray sizing, etc.

The diaphragm paper used as battery diaphragm materials provided by the present invention possess a "sandwich" structure: the first and the third layer of the diaphragm paper are "loose layers" having abundant porous structure; the second layer is "compact layer" having small pore size and compact structure. Such a structure can meet the requirements that the material can both absorb liquid and play a role of isolation.

The method for preparing the diaphragm paper of the present invention is preferably achieved by once-forming on a piece of paper-making wire through an inclined wire forming machine. This preparation method can obtain a diaphragm material, which has uniformly distributed porous structure and good interlayer bonding strength.

BRIEF DESCRIPTION OF THE DRAWINGS

FIG. 1 is the structural diagram of an ultra-low concentration inclined wire machine used in the present invention.

DETAILED DESCRIPTION OF THE PREFERRED EMBODIMENT

The manufacturing methods and processes of the present invention will be described in detail hereinafter in conjunction with the accompanying drawings:

As shown in FIG. 1, the present invention used an ultra-low concentration inclined wire machine to prepare the diaphragm. A is a pulp distributor of the inclined wire machine in this FIGURE, the pulp distributor A is divided into three layers which are mutually independent and expressed respectively in 1, 2, 3, in order that the pulp entering the pulp distributor will not mix. B is a rectifying zone of the inclined wire machine, the rectifying zone is also divided into three flow channels, which matches with layers 1, 2 and of the pulp distributor A. The function of the rectifying zone B is to rectify the pulp from the pulp distributor A, so as to generate a flow state of high intensity and micro-scale turbulence and no vortex is formed, thereby making the flow regime of the pulp stable, this can ensure that no blending occurs when the pulp in three layers are formed and good uniformity can be obtained. The pulp goes through the rectifying zone B and then arrives at the dewatering and forming zone C of the inclined wire machine, the pulp in three layers from the rectifying zone B are dewatered and formed at the dewatering and forming zone C by dewatering freely or dewatering under a certain vacuum. The pulp in the third layer arrives firstly at the dewatering forming zone C, so the pulp in the third layer is firstly dewatered and formed, followed by the pulp in the second layer, finally the pulp in the first layer, in such way the multi-layered paper having three-layer structure of the present invention can be formed once on the inclined wire machine. Since the paper-making process has a filling effect, i.e., after the previous layer is formed, larger holes may occur, the pulp at holes is little, so the resistance from the dewatering is small, the pulp in the second layer will select preferably to form at holes to make up for the defect of big holes, thereby ensuring the diaphragm will not appear more big holes. The forming time of the pulp in three layers is fairly short, the calculated value is less than 0.6 seconds, so the pulp in three layers will not mix, and there is no obvious layer interface, so that the multi-layered paper prepared both have the isolated layer and have the loose layer and the transition layer, and the interlayer bonding force is very good, there is no large shrinkage during use. The basis weight of each layer is controlled by adjusting precisely the concentrations and flow of the pulp in the 1, 2 and 3 layers. D is the multi-layer paper after forming uniformly, which is then squeezed to an appropriate dryness through the press section of the inclined wire machine, dried by a Yankee dryer or a multi-cylinder dryer, processed through a sizing treatment, then dried by a dryer, and then the surface of the diaphragm is treated by a calender, and finally is cut into the desired width by a dividing and cutting machine.

Now the performance of the specific preferred embodiment of the diaphragm paper of the present invention is compared with that of the single-layer diaphragm paper.

EXAMPLES 1-5

Diaphragm Papers Used for Alkaline Batteries

The composition and ratio of each layer in the diaphragm of examples 1-5 were shown in table 1. The raw materials were mixed with water in accordance with the formula, beated, diluted to 0.05% to obtain the pulp of the first layer, the second layer and the third layer. The pulp of the first layer was sent into flow channel 1, the pulp of the second layer was sent into flow channel 2, and the pulp of the third layer was sent into flow channel 3 by using the ultra-low concentration inclined wire machine shown in FIG. 1, once-forming was performed in accordance with the above-mentioned method to prepare the diaphragm papers of examples 1-5.

TABLE 1

| Raw material of examples 1-5 | | | |
|---|---|---|---|
| Examples | First layer (wt %) | Second layer (wt %) | Third layer (wt %) |
| 1 | 1. Hardwood pulp (25%) with a beating degree of 11-30° SR and a fiber length of 0.6-2 mm; | 1. Tencel fibrillated fiber (60%) with a beating degree of 60-80° SR; 2. Superfine polyvinyl | 1. Hardwood pulp (30%) with a beating degree of 11-30° SR and a fiber length of 0.6-2 mm; |

TABLE 1-continued

| | Raw material of examples 1-5 | | |
|---|---|---|---|
| Examples | First layer (wt %) | Second layer (wt %) | Third layer (wt %) |
| | 2. Viscose fiber (10%) with a fineness of 0.9 dtex and a fiber length of 3 mm;<br>3. Formalized polyvinyl alcohol fiber (50%) with a fineness of 1.0 dtex and a fiber length of 3 mm;<br>4. Water-soluble polyvinyl alcohol fiber (15%) with a fineness of 1.11 dtex, a fiber length of 3 mm and a water soluble temperature of 70° C. | alcohol fiber (35%) with a fineness of 0.5 dtex and a fiber length of 2 mm;<br>3. Water-soluble polyvinyl alcohol fiber (5%) with a fineness of 1.1 dtex, a fiber length of 3 mm and a water soluble temperature of 70° C. | 2. Viscose fiber (15%) with a fineness of 0.5 dtex and a fiber length of 3 mm;<br>3. Polyvinyl alcohol fiber (40%) with a fineness of 1.11 dtex and a fiber length of 3 mm;<br>4. Water-soluble polyvinyl alcohol fiber (15%) with a fineness of 1.1 dtex, a fiber length of 3 mm and a water soluble temperature of 70° C. |
| 2 | 1. Hardwood pulp (20%) with a beating degree of 11-30° SR and a fiber length of 0.6-2 mm;<br>2. Viscose fiber (15%) with a fineness of 0.9 dtex and a fiber length of 3 mm;<br>3. Formalized polyvinyl alcohol fiber (50%) with a fineness of 1.0 dtex and a fiber length of 3 mm;<br>4. Water-soluble polyvinyl alcohol fiber (15%) with a fineness of 1.1 dtex, a fiber length of 3 mm and a water soluble temperature of 70° C. | 1. Tencel fibrillated fiber (55%) with a beating degree of 60-80° SR;<br>2. Superfine polyvinyl alcohol fiber (40%) with a fineness of 0.5 dtex and a fiber length of 2 mm;<br>3. Water-soluble polyvinyl alcohol fiber (5%) with a fineness of 1.1 dtex, a fiber length of 3 mm, and a water soluble temperature of 70° C. | 1. Hardwood pulp (25%) with a beating degree of 11-30° SR and a fiber length of 0.6-2 mm;<br>2. Viscose fiber (20%) with a fineness of 0.5 dtex and a fiber length of 3 mm;<br>3. Polyvinyl alcohol fiber (40%) with a fineness of 1.11 dtex and a fiber length of 3 mm;<br>4. Water-soluble polyvinyl alcohol fiber (15%) with a fineness of 1.1 dtex, a fiber length of 3 mm and a water soluble temperature of 70° C. |
| 3 | 1. Hardwood pulp (20%) with a beating degree of 11-30° SR and a fiber length of 0.6-2 mm;<br>2. Viscose fiber (15%) with a fineness of 0.9 dtex and a fiber length of 3 mm;<br>3. Formalized polyvinyl alcohol fiber (50%) with a fineness of 1.11 dtex and a fiber length of 3 mm;<br>4. Water-soluble polyvinyl alcohol fiber (15%) with a fineness of 1.1 dtex, a fiber length of 3 mm and a water soluble temperature of 70° C. | 1. Tencel fibrillated fiber (50%) with a beating degree of 60-80° SR;<br>2. Superfine polyvinyl alcohol fiber (45%) with a fineness of 0.5 dtex and a fiber length of 2 mm;<br>3. Water-soluble polyvinyl alcohol fiber (5%) with a fineness of 1.1 dtex, a fiber length of 3 mm and a water soluble temperature of 70° C. | 1. Hardwood pulp (25%) with a beating degree of 11-30° SR and a fiber length of 0.6-2 mm;<br>2. Viscose fiber (20%) with a fineness of 0.5 dtex and a fiber length of 3 mm;<br>3. Polyvinyl alcohol fiber (40%) with a fineness of 1.11 dtex and a fiber length of 3 mm;<br>4. Water-soluble polyvinyl alcohol fiber (15%) with a fineness of 1.1 dtex, a fiber length of 3 mm and a water soluble temperature of 70° C. |
| 4 | 1. Hardwood pulp (20%) with a beating degree of 11-30° SR and a fiber length of 0.6-2 mm;<br>2. Viscose fiber (15%) with a fineness of 0.9 dtex and a fiber length of 3 mm;<br>3. Formalized polyvinyl alcohol fiber (50%) with a fineness of 1.11 dtex and a fiber length of 3 mm;<br>4. Water-soluble polyvinyl alcohol fiber (15%) with a fineness of 1.1 dtex, a fiber length of 3 mm and a water soluble temperature of 70° C. | 1. Tencel fibrillated fiber (50%) with a beating degree of 60-80° SR;<br>2. Superfine polyvinyl alcohol fiber (45%) with a fineness of 0.5 dtex and a fiber length of 2 mm;<br>3. Water-soluble polyvinyl alcohol fiber (5%) with a fineness of 1.1 dtex, a fiber length of 3 mm and a water soluble temperature of 70° C. | 1. Hardwood pulp (25%) with a beating degree of 11-30° SR and a fiber length of 0.6-2 mm;<br>2. Viscose fiber (20%) with a fineness of 0.5 dtex and a fiber length of 3 mm;<br>3. Polyvinyl alcohol fiber (40%) with a fineness of 1.11 dtex and a fiber length of 3 mm;<br>4. Water-soluble polyvinyl alcohol fiber (15%) with a fineness of 1.1 dtex, a fiber length of 3 mm and a water soluble temperature of 70° C. |

TABLE 1-continued

Raw material of examples 1-5

| Examples | First layer (wt %) | Second layer (wt %) | Third layer (wt %) |
|---|---|---|---|
| 5 | 1. Hardwood pulp (20%) with a beating degree of 11-30° SR and a fiber length of 0.6-2 mm; 2. Viscose fiber (15%) with a fineness of 0.9 dtex and a fiber length of 3 mm; 3. Formalized polyvinyl alcohol fiber (50%) with a fineness of 1.11 dtex and a fiber length of 3 mm; 4. Water-soluble polyvinyl alcohol fiber (15%) with a fineness of 1.1 dtex, a fiber length of 3 mm and a water soluble temperature of 70° C. | 1. Tencel fibrillated fiber (50%) with a beating degree of 60-80° SR; 2. Superfine polyvinyl alcohol fiber (45%) with a fineness of 0.5 dtex and a fiber length of 2 mm; 3. Water-soluble polyvinyl alcohol fiber (5%) with a fineness of 1.1 dtex, a fiber length of 3 mm and a water soluble temperature of 70° C. | 1. Hardwood pulp (25%) with a beating degree of 11-30° SR and a fiber length of 0.6-2 mm; 2. Viscose fiber (20%) with a fineness of 0.5 dtex and a fiber length of 3 mm; 3. Polyvinyl alcohol fiber (40%) with a fineness of 1.11 dtex and a fiber length of 3 mm; 4. Water-soluble polyvinyl alcohol fiber (15%) with a fineness of 1.1 dtex, a fiber length of 3 mm and a water soluble temperature of 70° C. |

COMPARATIVE EXAMPLES 1-2

Diaphragm Papers Used for Single-Layer Alkaline Batteries

The formula of the diaphragm paper used for single-layer alkaline batteries of comparative examples 1-2 were shown in table 2.

The raw materials were mixed with water and beated in accordance with the formula and then made paper according to the conventional method for making paper to obtain the diaphragm paper used for single-layer alkaline batteries.

TABLE 2

Raw materials of comparative examples 1-2

| Comparative examples | Single-layer structures |
|---|---|
| 1 | 1. Hardwood pulp (30%) with a beating degree of 11-30° SR and a fiber length of 0.6-2 mm; 2. Viscose fiber (15%) with a fineness of 0.9 dtex and a fiber length of 3 mm; 3. Formalized polyvinyl alcohol fiber (40%) with a fineness of 1.11 dtex and a fiber length of 3 mm; 4. Water-soluble polyvinyl alcohol fiber (15%) with a fineness of 1.1 dtex, a fiber length of 3 mm and a water soluble temperature of 70° C. |
| 2 | 1.Tencel fibrillated fiber (10%) with a beating degree of 60-80° SR; 2. Superfine polyvinyl alcohol fiber (40%) with a fineness of 1.1 dtex and a fiber length of 3 mm; 3. Water-soluble polyvinyl alcohol fiber (15%) with a fineness of 1.1 dtex, a fiber length of 3 mm and a water soluble temperature of 70° C.; 4. Hardwood pulp (35%) with a beating degree of 11-30° SR and a fiber length of 0.6-2 mm. |

EXPERIMENTAL EXAMPLE

The performance of the diaphragm papers prepared by examples 1-5 and comparative examples 1-2 were tested according to the following method.
 1. Testing Items and Methods
 1) Measurement of beating degree
The measurement was conducted according to ISO5267/1 international standards.

2) Measurement of average fiber length
The measurement was conducted by using FS300 fiber analyzer.
 3) Measurement of thickness, basis weight and tensile
The measurement was conducted according to Tappi standard.
 4) Measurement of air permeability
The measurement was conducted according to the textile testing method.
 5) Measurement of pore size
The measurement was conducted by using PMI pore size analyzer.
 6) Measurement of liquid absorption rate
A 50 mm×50 mm square diaphragm paper with a mass after drying of $W_1$ was taken and immersed in a 40% KOH solution for 10 minutes, one corner of the paper was fixed and suspended in an air for 2 minutes, then weighted (the mass was $W_2$).

$$\text{Liquid permeability}(\%) = (W_2 - W_1)/W_1 \times 100$$

The measurement was performed 5 times and the average value was taken.
 7) Measurement of liquid absorption height
A 15 mm×200 mm diaphragm paper slip was taken and suspended. One side of the paper (5 mm) was immersed in a 40% KOH solution. After 10 minutes, the electrolyte penetration height was measured as the absorption rate of the diaphragm electrolyte.

The measurement was performed 5 times and the average value was taken.
 8) Measurement of shrinking rate
A 100 mm×100 mm square diaphragm paper was taken. The area of the square diaphragm paper was recorded as $A_1$. The square diaphragm paper was immersed in a 40% KOH solution for 24 hours, and then taken out. The length and width of the square diaphragm paper were measured, the area of the square diaphragm paper after immersing was calculated as $A_2$.

$$\text{shrinking rate} = (A_1 - A_2)/A_1 \times 100\%$$

2. Measurement Results
All testing results of the diaphragm paper prepared by examples 1-5 were shown in table 3.

TABLE 3

Testing results of the diaphragm papers prepared by examples 1-5

| Examples | 1 | 2 | 3 | 4 | 5 |
|---|---|---|---|---|---|
| First Layer (g/m$^2$) | 10 | 12 | 14 | 10 | 18 |
| Second Layer (g/m$^2$) | 3 | 5 | 8 | 8 | 8 |
| Third Layer (g/m$^2$) | 12 | 13 | 14 | 18 | 10 |
| Basis Weight (g/m$^2$) | 25 | 30 | 36 | 36 | 36 |
| Thickness (μm) | 75 | 90 | 105 | 105 | 105 |
| Average Pore Size (μm) | 11 | 9.5 | 7.6 | 7.6 | 7.6 |
| Tensile Strength (KN) | 1.8 | 2.1 | 2.6 | 2.6 | 2.6 |
| Air Permeability (ml/s) | 260 | 230 | 190 | 190 | 190 |
| Liquid Absorption Rate (%) | 740 | 750 | 740 | 740 | 740 |
| Liquid Absorption Height (mm/10 min) | 62 | 64 | 68 | 68 | 68 |
| Shrinking Rate (%) | 2.0 | 2.0 | 2.0 | 2.0 | 2.0 |

All testing results of the diaphragm paper prepared by comparative examples 1-2 were shown in table 4.

TABLE 4

Testing results of the diaphragm papers prepared by comparative examples 1-2

| Comparative Examples | 1 | 2 |
|---|---|---|
| Structure | Single layer | Single layer |
| Basis Weight (g/m$^2$) | 36 | 36 |
| Thickness (μm) | 110 | 100 |
| Average Pore Size (μm) | 15 | 12 |
| Tensile strength (KN) | 2.4 | 2.5 |
| Air Permeability (ml/s) | 450 | 260 |
| Liquid Absorption Rate (%) | 770 | 580 |
| Liquid Absorption Height (mm/10 min) | 70 | 50 |
| Shrinking Rate (%) | 2.1 | 2.0 |

3. Conclusion

The results show that the performance of the multi-layer diaphragm papers prepared by examples 1-5 are better when comparing with the single-layer diaphragm papers prepared by comparative examples 1-2. Specifically, the pore size is small, the average pore size is substantially less than 10 μm, the tensile strength is good, the air permeability is good, the liquid absorption rate is large, and the shrinkage rate is small, all of which fully meet the requirement of diaphragm materials used for alkaline batteries.

EXAMPLES 6-10

Diaphragm Papers Used for Lithium Ion Batteries

The formula of the diaphragm paper of examples 6-10 were shown in table 5.

TABLE 5

Raw materials of examples 6-10

| Examples | First layer (wt %) | Second layer (wt %) | Third layer (wt %) |
|---|---|---|---|
| 6 | 1. PP fiber (50%) with a fineness of 0.9 dtex and a length of 3 mm; 2. PET fiber (50%) with a fineness of 1.0 dtex and a fiber length of 3 mm; 3. PE fiber (15%) with a fineness of 1.11 dtex and a fiber length of 3 mm. | 1. Para-Aramid fibrillated fiber (60%) with a beating degree of 60-80° SR; 2. Superfine PET fiber (40%) with a fineness of 0.1 dtex and a length of 2 mm. | 1. PP fiber (20%) with a fineness of 0.9 dtex and a length of 3 mm; 2. PET fiber (40%) with a fineness of 1.0 dtex and a length of 3 mm; 3. PE fiber (15%) with a fineness of 1.11 dtex and a length of 3 mm. |
| 7 | 1. PP/PE composite fiber (100%) with a fineness of 0.9 dtex and a length of 3 mm. | 1. PBO fibrillated fiber (60%) with a beating degree of 60-80° SR; 2. Superfine PET fiber (40%) with a fineness of 0.1 dtex and a length of 2 mm. | 1. PP fiber (20%) with a fineness of 0.9 dtex and a length of 3 mm; 2. PET fiber (40%) with a fineness of 1.0 dtex and a length of 3 mm; 3. PE fiber (15%) with a fineness of 1.11 dtex and a length of 3 mm. |
| 8 | 1. PP/EVOH composite fiber (80%) with a fineness of 0.9 dtex and a length of 3 mm; 2. PE fiber (20%) with a fineness of 0.5 dtex and a length of 3 mm. | 1. PBO fibrillated fiber (70%) with a beating degree of 60-80° SR; 2. Superfine PP fiber (40%) with a fineness of 0.3 dtex and a length of 2 mm. | 1. PP/EVOH composite fiber (80%) with a fineness of 0.9 dtex and a length of 3 mm; 2. PE fiber (20%) with a fineness of 0.5 dtex and a length of 3 mm. |
| 9 | 1. PP/EVOH composite fiber (80%) with a fineness of 0.9 dtex, length of 3 mm; 2. PE fiber (20%) with a fineness of 0.5 dtex and a length of 3 mm. | 1. Tencel fibrillated fiber (50%) with a beating degree of 60-80° SR; 2. PBO fiber fibrillated fiber (30%) with a beating degree of 70-90° SR; 3. Superfine PP fiber (20%) with a fineness of 0.3 dtex and a length of 2 mm. | 1. PP/EVOH composite fiber (80%) with a fineness of 0.9 dtex and a length of 3 mm; 2. PE fiber (20%) with a fineness of 0.5 dtex and a length of 3 mm. |

TABLE 5-continued

Raw materials of examples 6-10

| Examples | First layer (wt %) | Second layer (wt %) | Third layer (wt %) |
| --- | --- | --- | --- |
| 10 | 1. PP fiber (10%) with a fineness of 0.9 dtex and a length of 3 mm; 2. PET fiber (50%) with a fineness of 1.0 dtex and a length of 3 mm; 3. PE fiber (15%) with a fineness of 1.11 dtex and a length of 3 mm. | 1. Tencel fibrillated fiber (50%) with a beating degree of 60-80° SR; 2. PBO fiber fibrillated fiber (30%) with a beating degree of 70-90° SR; 3. Superfine PP fiber (20%) with a fineness of 0.3 dtex and a length of 2 mm. | 1. PP fiber (10%) with a fineness of 0.9 dtex and a length of 3 mm; 2. PET fiber (50%) with a fineness of 1.0 dtex and a length of 3 mm; 3. PE fiber (15%) with a fineness of 1.11 dtex and a length of 3 mm. |

The diaphragm papers used for lithium ion batteries were prepared according to the preparation method of examples 1-5 and the testing results were shown in table 6.

TABLE 6

Testing results of the diaphragm papers prepared by examples 6-10

| Examples | 6 | 7 | 8 | 9 | 10 |
| --- | --- | --- | --- | --- | --- |
| First Layer (g/m²) | 8 | 10 | 13 | 15 | 20 |
| Second Layer (g/m²) | 4 | 5 | 4 | 8 | 10 |
| Third Layer (g/m²) | 8 | 10 | 13 | 17 | 20 |
| Basis Weight (g/m²) | 20 | 25 | 30 | 40 | 50 |
| Thickness (μm) | 18 | 28 | 35 | 40 | 60 |
| Average Pore Size (μm) | 5.0 | 6.2 | 7.6 | 8.1 | 7.7 |
| Tensile Strength (KN) | 1.8 | 2.2 | 2.6 | 2.7 | 2.5 |
| Air Permeability (ml/s) | 50 | 70 | 100 | 120 | 140 |
| Liquid Absorption Rate (%) | 320 | 370 | 420 | 500 | 520 |
| Liquid Absorption Height (mm/10 min) | 34 | 36 | 38 | 45 | 55 |
| Shrinking Rate (%) | 1.0 | 1.1 | 2.0 | 1.7 | 1.8 |

The results show that the multi-layer diaphragm paper prepared by examples 6-10 have superior performance, wherein the pore size is small, the average pore size is less than 10 μm, the tensile strength is good, the air permeability is good, the liquid absorption rate is large and the shrinkage rate is small, all of which fully meet the requirement of diaphragm materials used for lithium ion batteries.

EXAMPLE 11

A Alkaline Zinc Manganese Battery

The diaphragm paper prepared by example 1 was tailored to an appropriate size, placed between the positive electrode material and the negative electrode material, the alkaline zinc manganese battery was prepared according to the conventional method for making alkaline zinc manganese batteries.

EXAMPLE 12

A Lithium Ion Battery

The diaphragm paper prepared by example 6 was to tailored an appropriate size, placed between the positive electrode material and the negative electrode material, the lithium ion battery was prepared according to the conventional method for making lithium ion batteries.

The invention claimed is:

1. A diaphragm paper, comprising a first layer, a second layer and a third layer, the second layer is located between the first layer and the third layer; wherein, the first layer and the third layer are loose layers, with an average pore size greater than 10 μm and a basis weight of 5 to 30 g/m²,
the first layer contains hardwood pulp with a beating degree of 11-30° SR and a fiber length of 0.6-2 mm, viscose fiber with a fineness of 0.9 dtex and a fiber length of 3 mm, formalized polyvinyl alcohol fiber with a fineness of 1.0 dtex and a fiber length of 3 mm, and water-soluble polyvinyl alcohol fiber with a fineness of 1.11 dtex, a fiber length of 3 mm and a water soluble temperature of 70° C.,
the third layer contains hardwood pulp with a beating degree of 11-30° SR and a fiber length of 0.6-2 mm, viscose fiber with a fineness of 0.5 dtex and a fiber length of 3 mm, polyvinyl alcohol fiber with a fineness of 1.11 dtex and a fiber length of 3 mm, and water-soluble polyvinyl alcohol fiber with a fineness of 1.1 dtex, a fiber length of 3 mm, and a water soluble temperature of 70° C.;
the second layer is a compact layer, with an average pore size lesser than 5 μm and a basis weight of 2 to 15 g/m², contains tencel fibrillated fiber with a beating degree of 60-80° SR, superfine polyvinyl alcohol fiber with a fineness of 0.5 dtex and a fiber length of 2 mm, and water-soluble polyvinyl alcohol fiber with a fineness of 1.1 dtex, a fiber length of 3 mm and a water soluble temperature of 70° C.

2. The diaphragm paper according to claim 1, wherein, the first layer and the third layer each independently accounts for 20 wt % to 40 wt % of the total mass of the diaphragm paper, the second layer accounts for 20 wt % to 60 wt % of the total mass of the diaphragm paper.

3. The diaphragm paper according to claim 1, wherein, further comprising 0.1% to 1% of a sizing layer based on the total mass of the diaphragm paper, the sizing layer locates outside of the first layer and the third layer and is made up of one surface treatment agent selected from the group consisting of polyethylene oxide (PEO), surfactants such as sodium dodecyl benzene sulfonate, wetting fluid etc.

4. A battery, wherein, having the diaphragm paper according to claim 1 as a diaphragm located between the positive electrode and the negative electrode.

* * * * *